(12) United States Patent
Steingruebner et al.

(10) Patent No.: US 7,209,884 B2
(45) Date of Patent: Apr. 24, 2007

(54) SPEECH INPUT INTO A DESTINATION GUIDING SYSTEM

(75) Inventors: Mihai Steingruebner, Jersey City, NJ (US); Tarek Said, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 849 days.

(21) Appl. No.: 10/181,292

(22) PCT Filed: Mar. 8, 2001

(86) PCT No.: PCT/EP01/02606

§ 371 (c)(1),
(2), (4) Date: Jul. 16, 2002

(87) PCT Pub. No.: WO01/69592

PCT Pub. Date: Sep. 20, 2001

(65) Prior Publication Data

US 2003/0014255 A1 Jan. 16, 2003

(30) Foreign Application Priority Data

Mar. 15, 2000 (DE) .................. 100 12 572

(51) Int. Cl.
*G10L 15/08* (2006.01)
(52) U.S. Cl. ..................... 704/275; 704/270
(58) Field of Classification Search ............ None
See application file for complete search history.

(56) References Cited

U.S. PATENT DOCUMENTS

| | | | |
|---|---|---|---|
| 4,866,778 A | | 9/1989 | Baker |
| 5,956,684 A | * | 9/1999 | Ishii et al. .................. 704/275 |
| 6,023,697 A | * | 2/2000 | Bates et al. ................. 704/276 |
| 6,108,631 A | * | 8/2000 | Ruhl .......................... 704/270 |
| 6,230,132 B1 | * | 5/2001 | Class et al. ................. 704/270 |
| 6,385,582 B1 | * | 5/2002 | Iwata ......................... 704/270 |
| 6,567,778 B1 | * | 5/2003 | Chao Chang et al. ...... 704/257 |
| 6,961,706 B2 | * | 11/2005 | Saito .......................... 704/275 |

FOREIGN PATENT DOCUMENTS

| | | |
|---|---|---|
| DE | 19709518 | 3/1998 |
| EP | 0905662 | 3/1999 |
| WO | WO9948088 | 9/1999 |

* cited by examiner

*Primary Examiner*—David D. Knepper
(74) *Attorney, Agent, or Firm*—Crowell & Moring LLP

(57) ABSTRACT

A system and method are provided for the voice input of a destination using a defined input dialog into a destination guiding system in real-time operation. Devices are included by which an entered voice statement of a user is detected via a voice recognition device, compared with stored voice statements and classified according to its recognition probability, and by which the stored voice statement is recognized as the entered voice statement with the highest recognition probability. The stored voice statements assigned to a destination are composed at least of the destination name and at least a regionally limiting additional information unambiguously identifying the destination name. Each destination name is stored with a flag symbol in a first database and each additional information is stored in a second database.

27 Claims, 7 Drawing Sheets

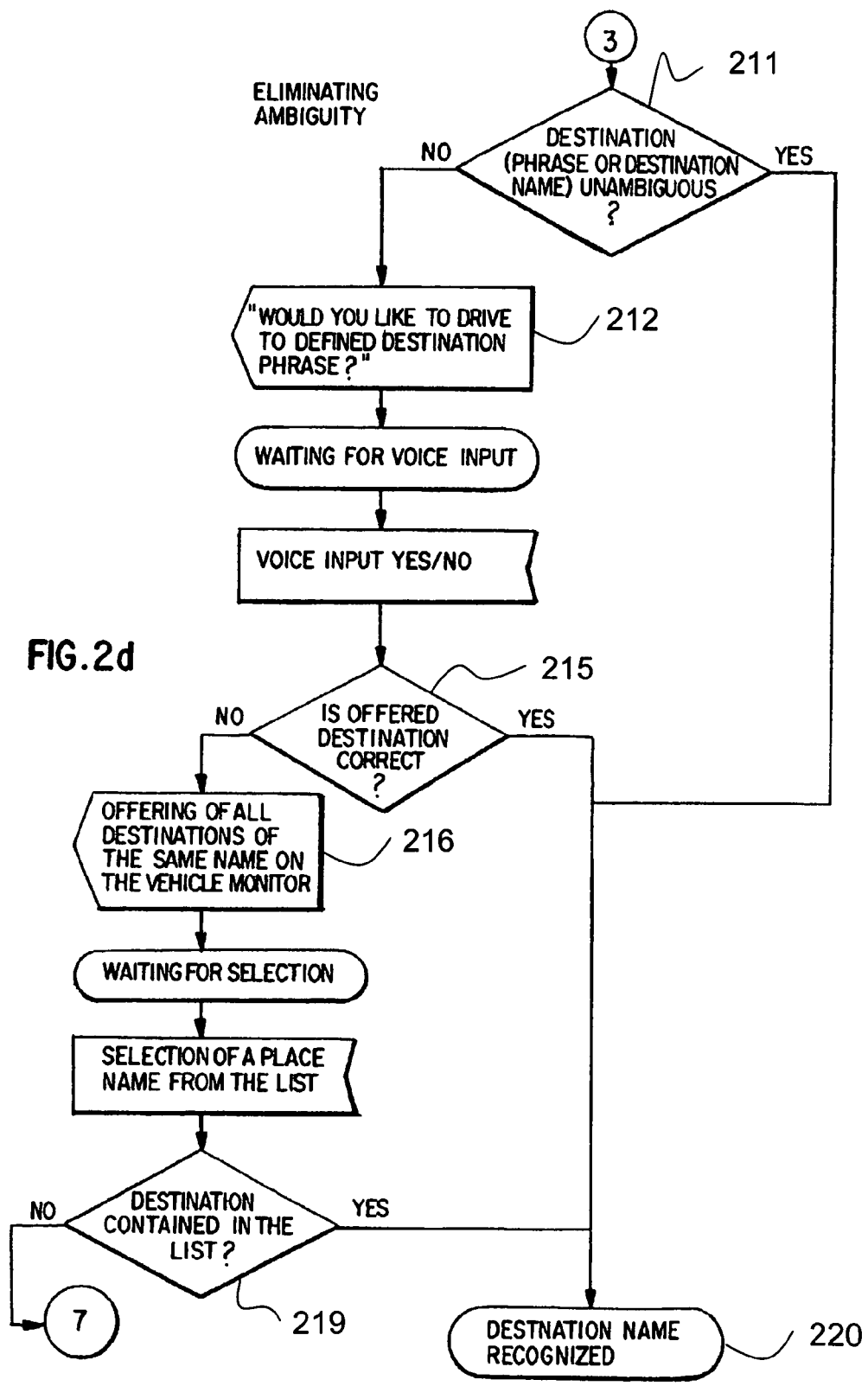

SPEECH INPUT INTO A DESTINATION GUIDING SYSTEM

BACKGROUND AND SUMMARY OF THE INVENTION

The invention relates to a system and a process for the voice input of a destination into a destination guiding system using a defined input dialog into a destination guiding system.

A system and a process of this type are known, for example, from German Patent document DE 197 09 518 C1. In this known process, several operating functions selectable by voice commands are offered to the user. For each selectable operating function, a lexicon is generated from a general databank, whereby a faster and user-friendlier voice-controlled search for destination addresses is to be permitted. In this case, German Patent document DE 197 09 518 C1 is based on known systems, which require a spelling of the destinations. However, a destination guiding system according to German Patent document DE 197 09 518 C1 also does not provide a user-friendly input possibility because, before a destination input, a voice command is first required for the selection of a desired operating function. Before a destination input, the user has to select the manner by which the destination is input; for example, whether the destination is to be spelled, whether the destination is to be searched by way of a destination area input or whether it is to be searched by way of an input of the destination name. The input of the destination name, for example, requires the search in a lexicon with all destination names. In Germany, such a lexicon would comprise a volume of approximately 60,000 locations. This abundance of stored voice statements can no longer be satisfactorily handled by the known voice recognition systems (usually so-called HMM systems) whose limit for a good speed recognition rate is empirically at approximately 1,000 words.

It is an object of the invention to improve a system and a process of the initially mentioned type with respect to an easier operability and with respect to the above-mentioned limit of known voice recognition systems.

This object is achieved by a system for the voice input of a destination by means of a defined input dialog into a destination guiding system in real-time operation. The system has devices, by which an entered voice statement of a user is detected via a voice recognition device. The entered voice statement is compared with stored voice statements and is classified according to its recognition probability by means of which the stored voice statement is recognized as the entered voice statement with the highest recognition probability. The stored voice statements assigned to a destination are composed at least of the destination name and at least a regionally limiting additional information unambiguously identifying the destination name, each destination name being stored with a flag symbol in a first database and each additional information being stored in a second database. Advantageous further developments of the invention are the objects of the dependent claims.

According to the invention, the stored voice statements assigned to a destination are composed at least of the destination name and at least one regionally limiting additional information, which unambiguously identifies the destination name. Each destination name is stored in a first database and each eligible additional information (without any destination name) is stored in a second database. Each piece of data relating to the destination or each input concerning a destination name in the first database comprises a flag symbol. Such a flag symbol may, for example, be a program-related marker for rapidly finding the piece of data. The marker or the flag symbol preferably characterizes the additional information itself assigned to the respective piece of data.

In this case, the second database is naturally much smaller than the first. Regionally limiting additional information consists, for example, of federal states, regional names, administrative districts, rivers, lakes and/or prominent larger cities. The additional information can preferably be differentiated unambiguously; that is, identical additional information does not exist in the second database. This additional information should be so-called identifiers by which the problem of the ambiguity of identical destination names (such as Münster near Straubing, Münster in Lower Franconia) is also solved. The identifiers are preferably selected such that their number does not exceed the above-mentioned limit for good voice recognition.

This databank structure according to the invention is preferably used such that, after an entered voice statement, the latter is in each case first compared with the identifiers stored in the smaller second database. Only when an identifier is recognized in the second database, will the voice recognition of the destination name be continued. In this case, the entire first database is not searched for the destination name with respect to the entered voice statement but only a partial data stock assigned to the recognized identifier and generated from the first database.

In a third database, prepositions can be stored which are used for separating the destination name and the additional information in an entered voice statement.

At best, the user speaks a phrase as a voice statement which consists of the destination name, a preposition and the additional information. However, it is important to the invention that, at the beginning, the input dialog permits a single word input as well as a phrase input, for example, in the form of the destination name, the preposition and the identifier, or in the form of the destination name and the identifier, as the voice input. After the input of a voice statement, the voice recognition device checks whether at least a part of the voice statement is additional information. The voice recognition devices guide the user, as required, that is, particularly when no part of the voice statement is recognized as additional information, in the further course to the voice input of additional information or to a defined phrase input, by which the voice recognition device can recognize that at least a part of the voice statement is additional information.

The user is flexible in the presentation of his voice statement and does not have to make any manual operating function selection (such as a "a destination area input"). In addition, a learning effect takes place. After repeated use, the user will automatically offer to the system the optimal phrase input in the form of the destination name, the preposition and the additional information.

The entered voice statement is preferably assigned by the voice recognition device to one of at least two input categories. In this case, a first input category is defined as a phrase input when the voice recognition device considers a part of the voice statement to be additional information. A second input category is defined as a single word input when the voice recognition device considers no part of the voice statement to be additional information.

When a part of the voice statement is recognized as additional information, then for the voice recognition of the destination name, the entire database will not be searched with respect to the destination name in view of the entered voice statement. On the contrary, by means of the flag symbols from the first database, a partial data stock is generated which is assigned to the known identifier. The partial data stock can be generated on the basis of an environment list assigned to the identifier. Such an environment list contains all destination names or flag symbols of the destination names which are eligible for the respective identifier. The environment lists can be stored inside or outside of the second database. As an alternative, without the presence of such environment lists, the first database can be searched for the flag symbols characterizing the respectively recognized identifier. Finally, the partial data stock contains at least the data of the destination names required for the voice recognition which are eligible with respect to the identifier. Such destination name data comprise particularly also reference models or principles for establishing reference models for the voice recognition according to processes known from the prior art. Therefore, the entered voice statement, for finding the desired destination name, only has to be compared with the respective dynamically generated partial data stock.

If no destination name was recognized, either an input dialog with a repeated query of the destination name or of the additional information can follow, or a list can be offered for the selection of a destination name (for example, by a reading-out and a voice-controlled operation, by a display on the video screen with a manual selection possibility, or by a display on the video screen and a voice-controlled selection).

When no part of the voice statement is considered to be additional information, a search takes place in the second database for the entire voice statement. The purpose of this approach is a fast search for a destination name which may also be an identical additional information. Preferably, only that additional information in the second database is compared with the entered voice statement which may also represent destination names.

When no additional information is recognized in the second database, the user is requested within the scope of another input dialog to carry out a voice input of an additional information. In this case, either an additional information alone or a phrase input (with additional information) may be requested. The previously entered voice statement is preferably interpreted as the destination name and is stored for the later voice recognition of the destination name.

An entered voice statement is categorized as a phrase input when a part of the voice statement is recognized as a preposition or as an identifier which is preceded by a part of the voice statement.

It is an important aspect of the invention that, independently of the form of the voice input, a first search never takes place in the first database but only in the second database. The first database is used as a basis for dynamically generating a partial data stock as a function of the additional information recognized in the second database. The entire first database is never used for the voice recognition of a destination name itself, but only the partial data stock taken from the first database. If no additional information is considered as being recognized, the input dialog of the voice recognition system guides the user at least to an input of the identifier or to the input of a phrase which, according to the definition, contains an identifier.

The drawing illustrates an embodiment of the invention.

BRIEF DESCRIPTION OF THE DRAWINGS

FIGS. 2a to 2h are views of a process according to the invention in the form of a possible input dialog flow chart.

DETAILED DESCRIPTION OF THE DRAWINGS

Figure 1:
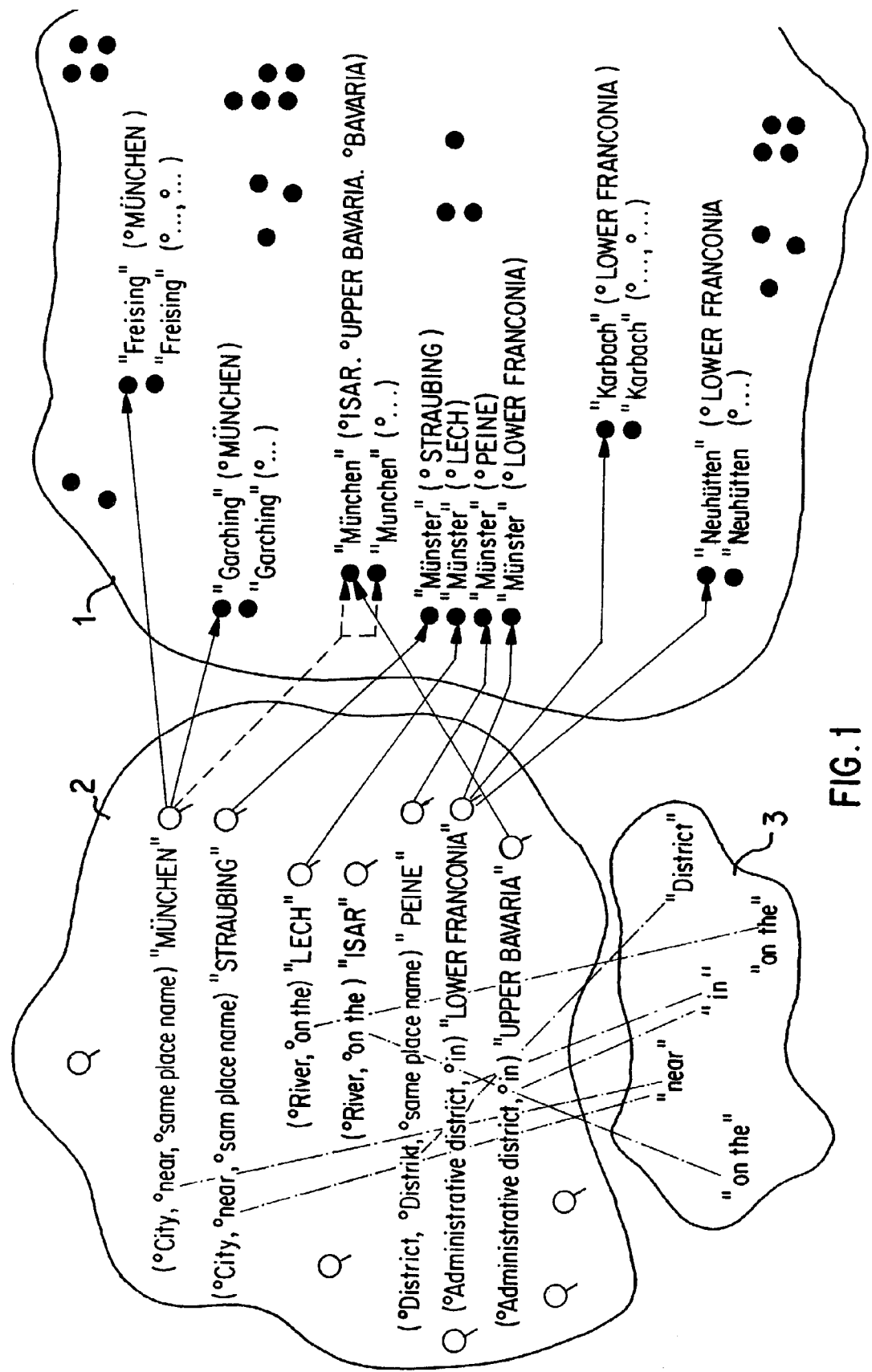
FIG. 1 is a view of a system according to the invention in the form of a corresponding databank structure.

FIG. 1 shows three databases 1, 2 and 3. The first database 1 contains, for example, all possible destination names of Germany in the form of destination name data. A destination name piece of data comprises, for example, an identifier-related mark and a reference model for the voice recognition. The second database 2 contains all possible identifiers, each identifier being followed at least by a list of pertaining destination names in the form of their identifier-related markers. In the following, this list will be called the "environment list". In the third database 3, all prepositions are stored which are eligible in connection with phrase inputs. For Germany, database 1 comprises approximately 60,000 destination names; database 2 comprises approximately 500 identifiers, and database 3 comprises approximately 70 prepositions. This example is mentioned only in order to illustrate the order of magnitude of the databank structure consisting of the three databases 1 to 3.

An optimal phrase input according to the invention is composed of a destination name, of a preposition following the destination name and of an identifier following the preposition. There are no identical identifiers. However, there may be identical identifiers and destination names (for example, "München"). Identical destination names have different identifiers in order to exclude the ambiguity of destination names.

Possible phrase inputs concerning the examples according to FIG. 1:

"Garching near München"
"Freising near München"
"München in Upper Bavaria" or
"München on the Isar" or
"München in Bavaria"
"Münster near Straubing"
"Münster on the Lech"
"Münster District Peine"
"Münster in Lower Franconia"
"Neuhütten in Lower Franconia"
"Karbach in Lower Franconia"

The database 3 contains, for example, the possible prepositions "in", "near", "on the", "district". As identifiers, the database 2 contains, for example, (larger) cities (such as "München", "Straubing"), rivers (such as, "Lech", "Isar"), districts (such as "Peine"), regional names and administrative districts (such as "Lower Franconia", "Upper Bavaria"). For each identifier, additional characteristic information, such as the identifier category "city", "river", "district" or "administrative district", and the information concerning an identical destination name can be stored in database 1.

In the case of the examples mentioned here, it is assumed that the voice statement was correctly understood, otherwise inquiry dialogs would be necessary.

In the case of a phrase input (for example, "Münster in Lower Franconia") the identifier "Lower Franconia" is searched in database 2 and the identifier with the greatest recognition possibility is selected. Subsequently, on the basis of the "environment list" (here: "Münster", "Karbach" and "Neuhütten" or the list of the program-related markers assigned to these destination names), which follows the identifier "Lower Franconia", a partial data content consisting at least of the destination name data required for the voice recognition is dynamically established by means of the markers from the first database 1. The entered destination name is searched from this regionally limited partial data stock. Here also, the destination name ("Münster") is considered to be recognized with the greatest recognition probability. This search strategy by means of the databank structure according to the invention is faster and leads to a more reliable recognition than a voice-recognition-related searching of the entire database 1 for the destination name and a subsequently required inquiry dialog in the case of an ambiguity as in the case of the prior art.

In the case of a single-word input (for example, "München"), the entire voice statement is first interpreted as the identifier and is searched in the second database 2. Since, on the one hand, "München" corresponds to an identifier in database 2 and, on the other hand, to at least one identical destination name in database 1 and this is also assigned to the identifier "München" as information, a list of all "München" names is established as destination names and is offered for a selection, for example, according to the size of the places while indicating the respective identifier (for example, in "Upper Bavaria"). Like the environment list, this list can also be stored at the respective identifiers in the second database 2.

If an identifier, in fact, corresponds to an identical desired destination, this search strategy is the fastest possible. Thus, at least for this case, the user friendliness is optimized. Neither an inquiry dialog, nor an operating function selection by a preceding voice command as in the prior art are required.

If the desired destination name does not exist as an identifier in database 2, the input dialog is further developed such that the user is guided to a phrase input or at least to the input of an identifier.

FIGS. 2a to 2h illustrate a flow chart of the process according to the invention, for a possible total input dialog, and partially also for a case in which the voice recognition device may possibly incorrectly understand a voice statement.

Figure 2A:
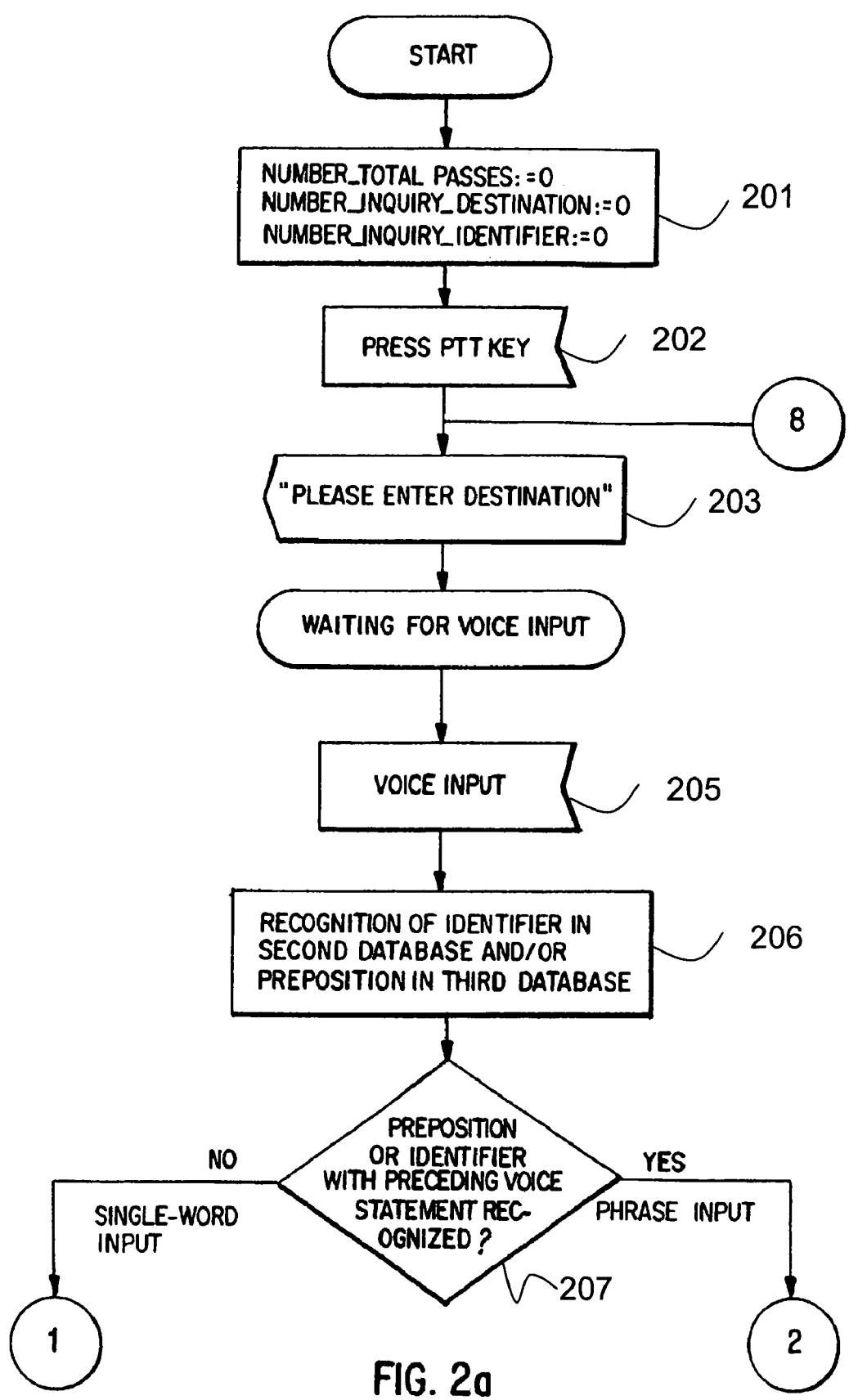
Figure 2B:
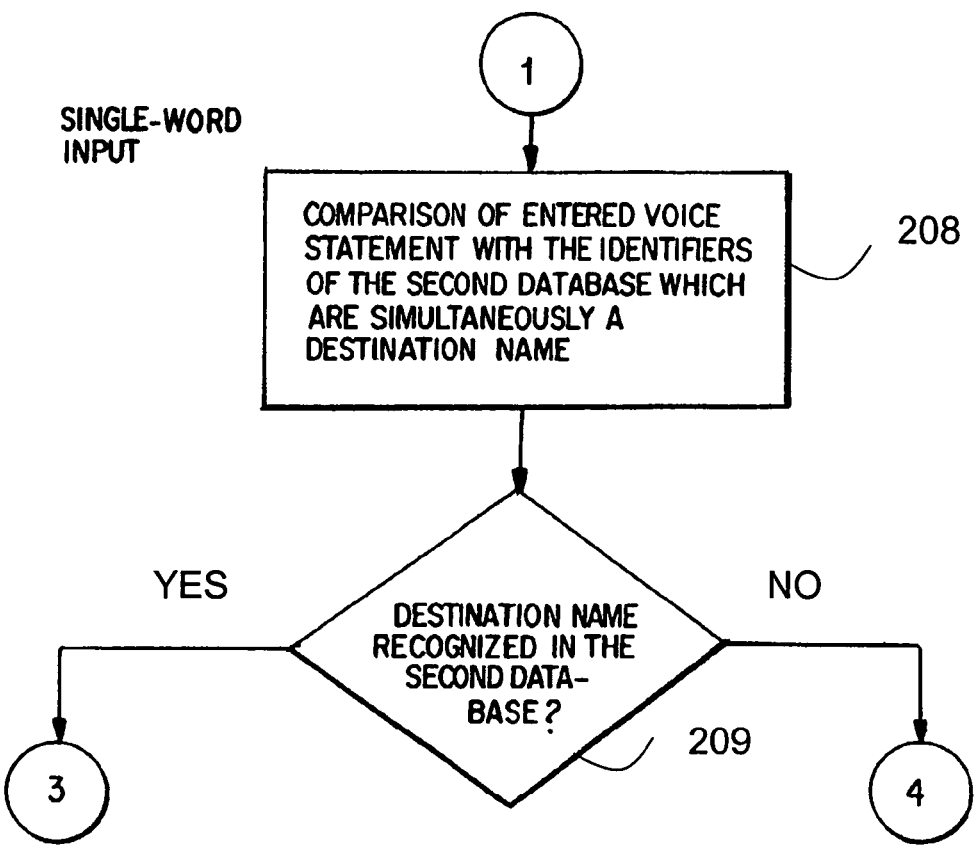
Figure 2C:
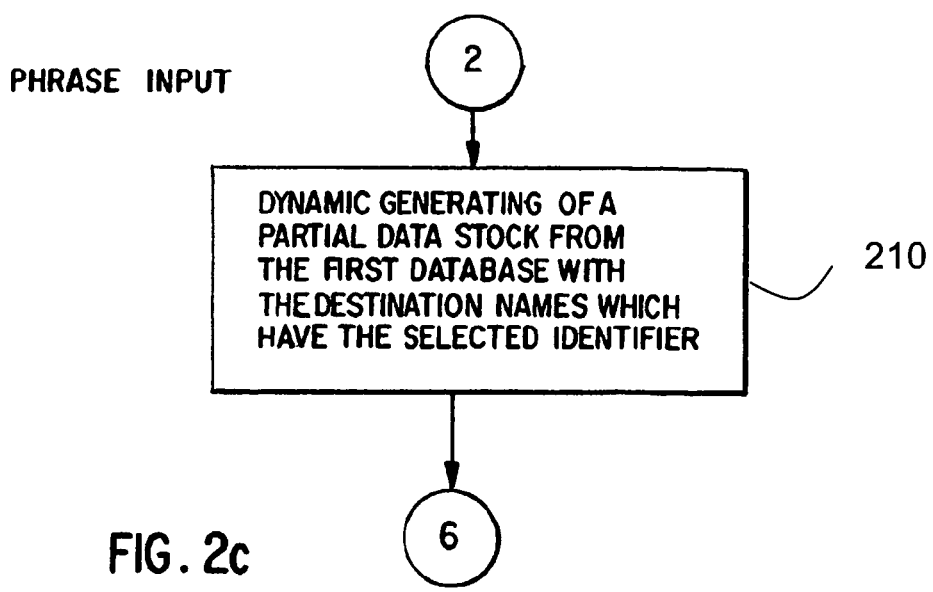

FIG. 2a shows the start of the flow chart for a voice-controlled destination input, for example, by a voice command or by a manual key pressure (step 202). As explained in greater detail below, the subsequent definition of the variable NUMBER_TOTAL PASSES, NUMBER_INQUIRY_DESTINATION and NUMBER_INQUIRY_IDENTIFIER is used for limiting the number of failed attempts (step 201).

The input dialog starts, for example, with the request, "Please enter the destination" (step 203). At best, the destination is then entered in the form of a phrase consisting of the parts: name of destination, preposition and identifier (step 205).

In the following, the further course is first explained with the example of the entered "München" voice statement. After the voice input, corresponding to FIG. 2a, the voice recognition system first attempts to separate a destination name, a preposition and an identifier, the search for the identifier taking place in the second database 2 and the search of the preposition taking place in the third database 3 (step 206). When an identifier with a preceding voice statement or a preposition is considered as being recognized ("Yes" path out of decision step 207), the entered voice statement is categorized as a phrase input (compare connector 2). When no identifier, which is preceding a part of the voice statement, or no preposition is recognized ("No" path out of decision step 207), the entered voice statement is categorized as a single-word input. Thus, a single-word input exists in the case of the "München" voice input. In the next step (compare connector 1), the entered "München" voice statement is compared with the identifiers, which simultaneously are also destination names and are stored in database 2, corresponding to FIG. 2b (compare connector 1) (step 208). In the example according to FIG. 1, an identifier is recognized in the case of the "München" voice input ("Yes" path out of decision step 209).

Then, the recognized identifier corresponding to FIG. 2d (compare connector 3), here "München", is checked with respect to ambiguity; that is, whether the destination name "München" occurs in Germany several times (step 211). This information is stored with the recognized identifier with reference to the corresponding destination names ("Yes" path out of decision step 211). In the case of unambiguous destination names, the destination has already been correctly recognized (step 220). In the present case, there are at least two "München" destination names. For example, in the following, the voice recognition system will first emit the largest destination in the form of a destination phrase, "Would you like to drive to München in Upper Bavaria?" (step 212). If this destination is confirmed to be the correct one ("Yes" path out of decision step 215), the destination input is successfully terminated (step 220). When, however, the offered destination is rejected ("No" path out of decision step 215), for example, all destinations of the same name, here, "München", with the indication of the geographic location ("München in Upper Bavaria", "München near Hamburg", . . . ) are offered on the vehicle monitor for the selection of the desired destination name from the list (step 216).

Figure 2E:
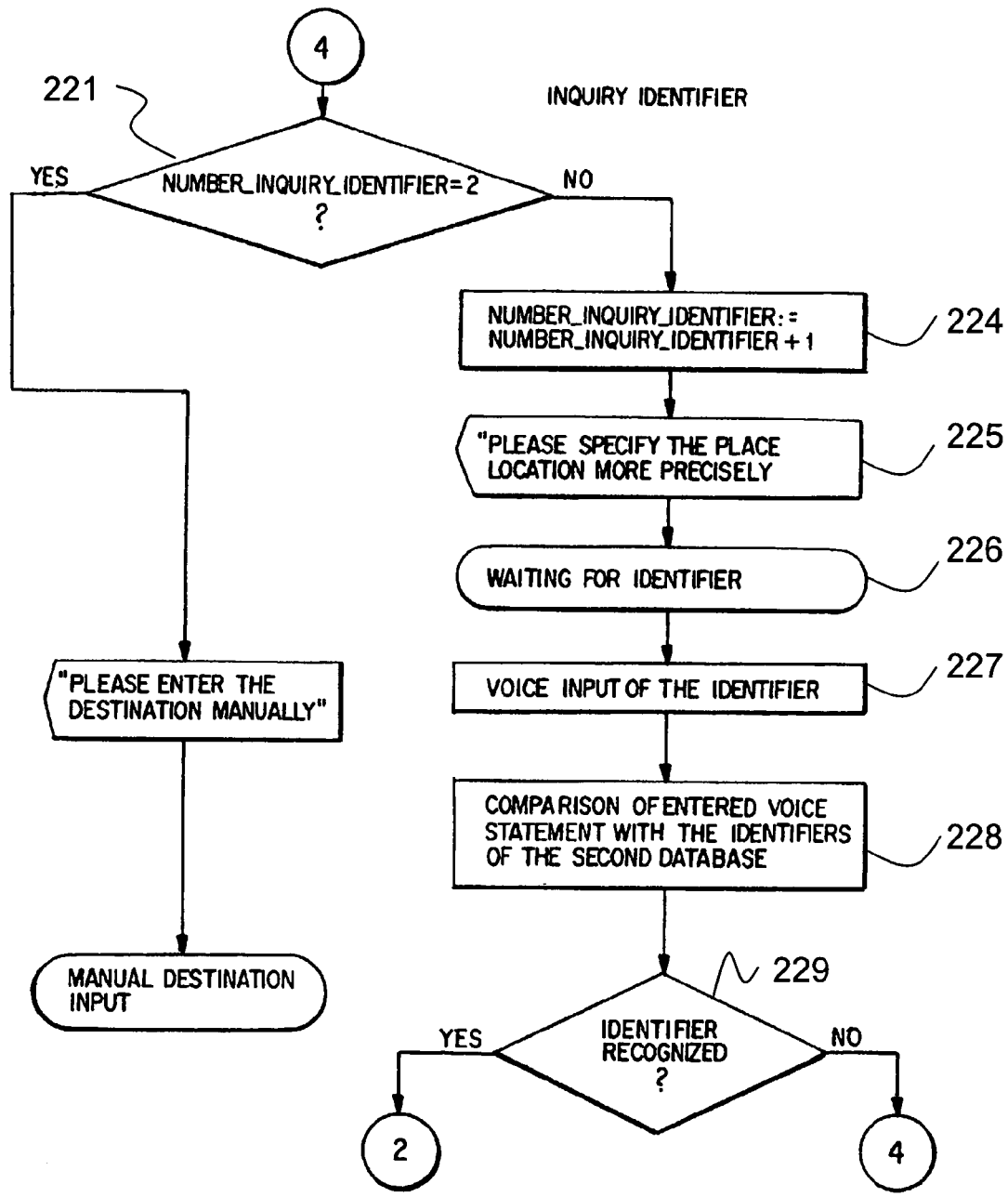
Figure 2F:
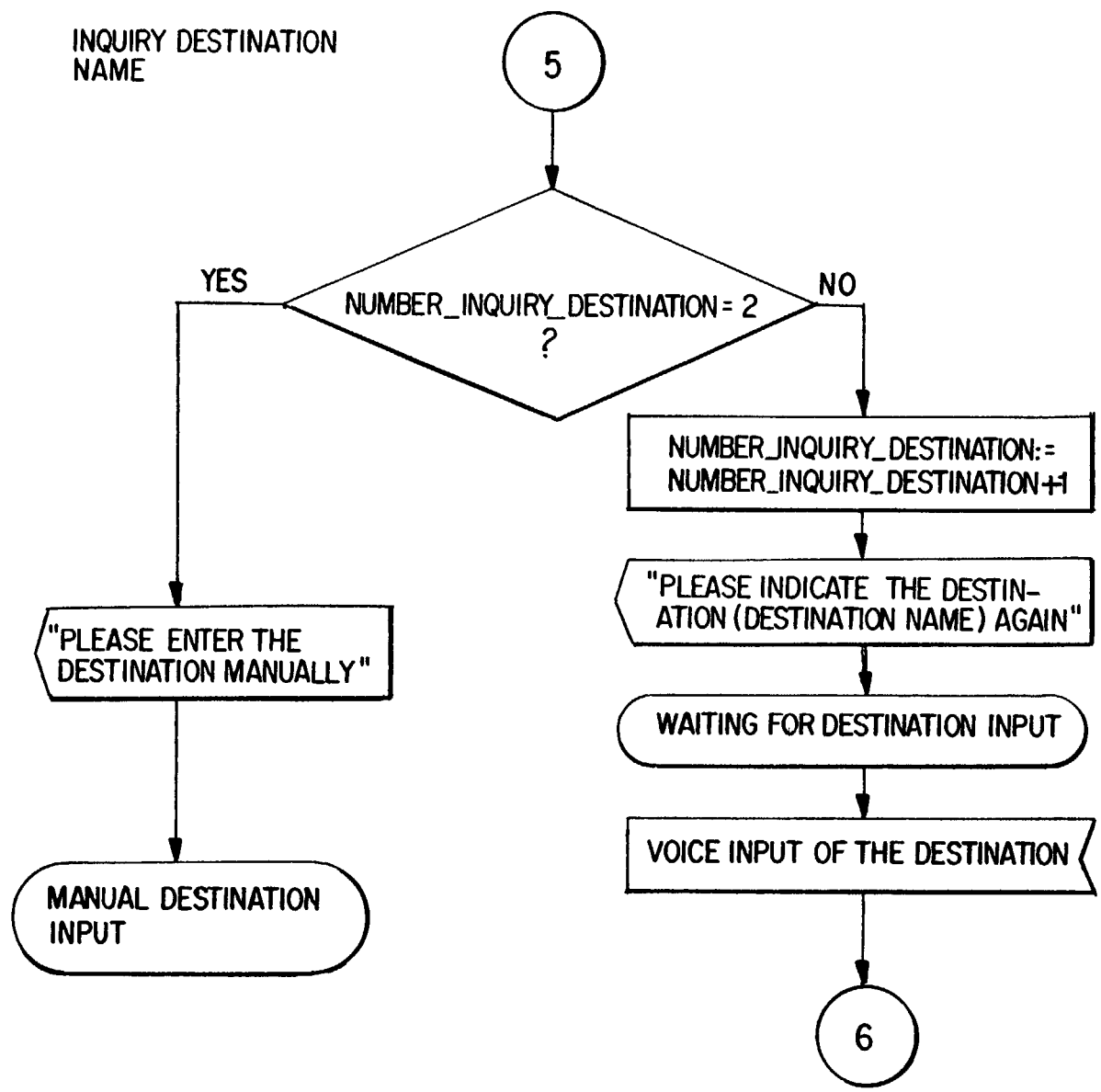
Figure 2G:
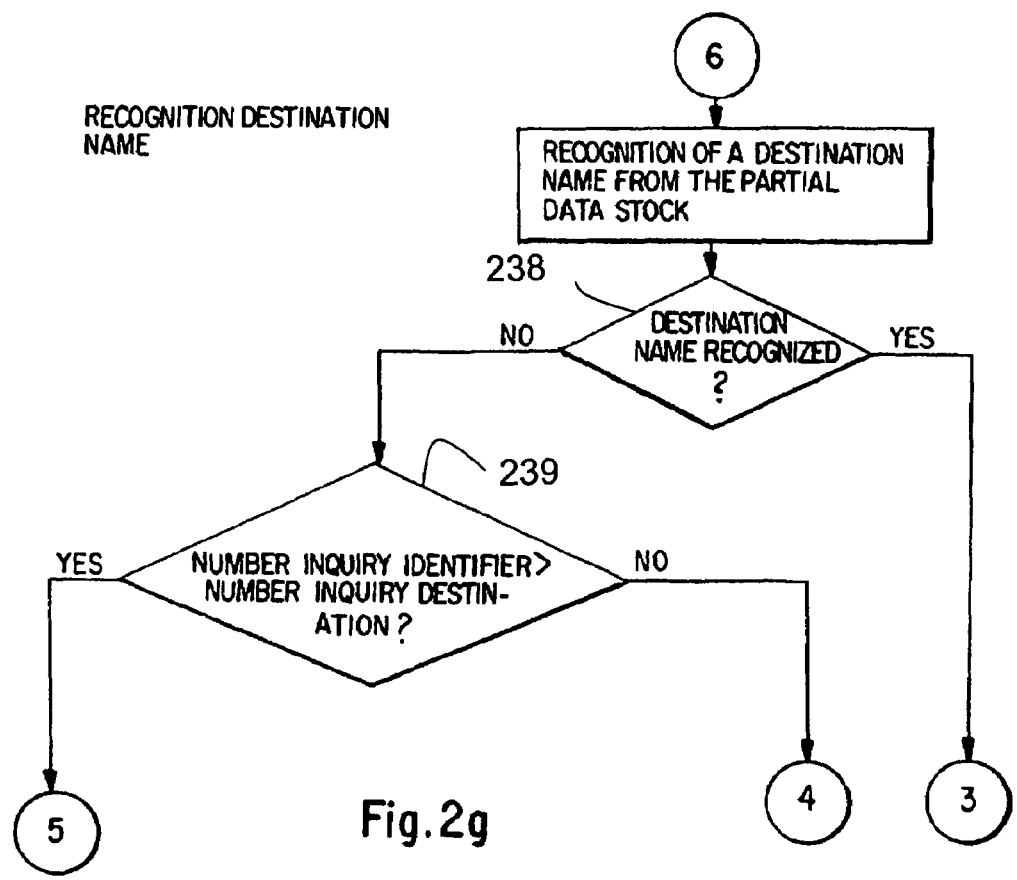
Figure 2H:
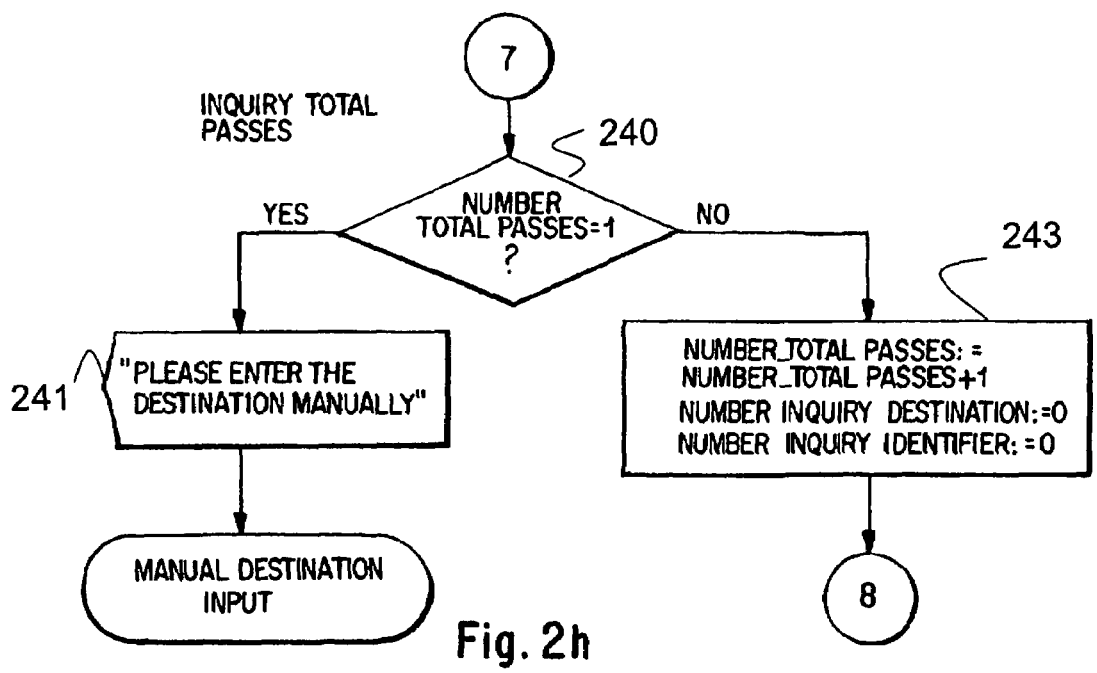

If the desired destination is not contained in the list ("No" path out of decision step 219), according to FIG. 2h (compare connector 7), it is checked by means of the counter NUMBER_TOTAL PASSES how many failed attempts have been made in a voice-controlled manner (step 240). When a defined threshold, here, NUMBER_TOTAL PASSES=2 has been reached ("Yes" path out of decision step 240), a manual destination input is suggested (step 241). If this defined threshold has not yet been reached ("No" path out of decision step 240), a return takes place to the start of the input dialog (compare connector 8) (step 243).

In the following, the flow chart will be explained in detail on the example of the "Münster" voice input in FIG. 2a. Again, the voice input is categorized as a single-word input ("No" path out of decision step 207). However, in this case, according to FIG. 2b, no identifier, which simultaneously is a destination name, is considered as being recognized in database 2 ("No" path out of decision step 209).

In this case, according to FIG. 2e (compare connector 4), first the frequency of the failed attempts is checked again by means of the counter NUMBER_INQUIRY_IDENTIFIER (step 221). When a defined threshold, here also, NUMBER_INQUIRY_IDENTIFIER=2, has not yet been reached ("No" path out of decision step 221), an inquiry dialog is started (step 224). The user is, for example, requested to specify a more precise place location (step 225). A voice input is awaited which at best is an identifier (step 226). In the example of the "Münster" destination name, at this point of the flow chart, for example, the voice input "Lower Franconia" or "in Lower Franconia" will follow (step 227). In the case of the voice input "in Lower Franconia", Lower Franconia is recognized as the identifier because this part of the voice statement follows the preposition "in" ("Yes" path out of decision step 229). In the case of the voice input "Lower Franconia", the entire voice statement is evaluated to be the identifier.

According to FIG. 2e, the voice statement is compared with all identifiers filed in the database 2 (step 228). In the case of the preceding voice input "in Lower Franconia", the identifier is separated from the preposition and is compared with all identifiers stored in database 2.

If no identifier is recognized from the database 2 ("No" path out of decision step 229), according to FIG. 2e (by way of connector 4 of FIG. 2e), as described above, the identifier is queried again (step 225). If an identifier is recognized and selected (compare connector 2, FIG. 2c), a voice-recognition-related partial data stock is dynamically, that is, in real time, generated on the basis of the "environment list" of the identifier from the first database 1 (step 210). In the present example, all destination name data, which are assigned to the "Lower Franconia" identifier, are selected: "Neuhütten", "Karbach" and "Münster". The voice input of the desired destination name, here "Münster", after the voice input according to FIG. 2a of the flow chart, can be stored until then in a volatile memory of the voice recognition system.

In the following, it is checked according to FIG. 2g (compare connector 6) in the generated partial data stock whether the voice input interpreted as the destination name corresponds to a destination from the partial data stock (step 238). If the destination name is recognized ("Yes" path out of decision step 238), the process is continued according to FIG. 2d (compare connector 3), as described above. However, if no destination name is considered to be recognized ("No" path out of decision step 238), for example, when the voice input "Münster" was pronounced incorrectly or too unclearly, another inquiry is made either with respect to the identifier according to FIG. 2e (by way of connector 4) or the destination name according to FIG. 2f (by way of connector 5). Here, the number of inquiry attempts of the identifier and the destination name are first compared with one another and the decision is made for the less queried information (step 239). However, maximally only two inquiry attempts are permitted for the identifier as well as for the destination name per total pass. Subsequently, the process is continued according to FIG. 29 (compare connector 6), as described above.

Finally, the flow chart will be explained in the following by means of an optimal phrase input in FIG. 2a. For example, after the request for the input of a destination, the voice input "Münster in Lower Franconia" takes place (step 205). In this example, it is assumed that the voice input is sufficiently unambiguous. Accordingly, a separation of the destination name, the preposition and the identifier is possible. Since a preposition as well as an identifier are present and are recognized as such, the voice input is categorized as a phrase input ("Yes" path out of decision step 207). The process will then take place according to FIG. 2c (by way of connector 2), as described above.

The invention claimed is:

1. A system for voice input of a destination into a destination guiding system via a defined input dialog in a real-time operation, the system comprising:
   a voice recognition device by which an entered voice statement of a user is detected, compared with stored voice statements and classified according to its recognition probability, and by which one of the stored voice statements is recognized as the entered voice statement with a highest recognition probability;
   wherein the stored voice statements assigned to a destination are composed at least of a destination name and at least a regionally limiting additional information that unambiguously identifies the destination name; and
   a first database in which each destination name is stored with a flag symbol; and
   a second database in which is stored each additional information, wherein when a part of the voice statement is recognized as the additional information in the second database, a partial data stock taken from the additional information of the first database is generated, and in said partial data stock the desired destination name is searched on the basis of the entered voice statement.

2. The system according to claim 1, further comprising a third database in which prepositions are stored, said prepositions being used for separating the destination name and the additional information in an entered voice statement.

3. A process for voice inputting a destination into a destination guiding system via a defined input dialog in a real-time operation, the processing comprising the acts of:
   detecting an entered voice statement of a user via a voice recognition device;
   comparing the detected entered voice statement with stored voice statements and classifying the detected entered voice statement according to its recognition probability;
   recognizing one of the stored voice statements having a highest recognition probability as the detected entered voice statement;
   wherein the stored voice statements assigned to a destination are composed at least of a destination name and at least a regionally limiting additional information that unambiguously identifies the destination name, each destination name being stored with a flag symbol in a first database and each additional information being stored in a second database, and wherein when a part of the voice statement is recognized as the additional information in the second database, a partial data stock taken from the additional information of the first database is generated, and in said partial data stock the desired destination name is searched on the basis of the entered voice statement.

4. The process according to claim 3, further comprising the act of using prepositions stored in a third database for separating the destination name and the additional information in an entered voice statement.

5. The process according to claim 4, further comprising the acts of:
   after inputting a voice statement, checking with the voice recognition device whether at least a part of the voice statement is an additional information; and
   if required, guiding a user in a further course to voice input an additional information or a defined phrase input by which the voice recognition device can recognize that at least a part of the voice statement is the additional information.

6. The process according to claim 4, further comprising the acts of:
   after the input of the voice statement, assigning the voice statement via the voice recognition device to one of at least two input categories, a first input category being defined as a phrase input if the voice recognition device considers a part of the voice statement to be the additional information, and a second input category being defined as a single-word input if the voice recognition device considers no part of the voice statement to be the additional information.

7. The process according to claim 6, further comprising the acts of:
searching the entire voice statement in the second database when no part of the voice statement is considered to be additional information; and
selecting from the second database the stored additional information having the highest recognition probability as the entered destination name.

8. The process according to claim 7, further comprising the act of:
if the additional information is not recognized in the second database, requesting the user within the scope of the further input dialog to carry out a voice input of an additional information.

9. The process according to claim 3, further comprising the acts of:
after inputting a voice statement, checking with the voice recognition device whether at least a part of the voice statement is an additional information; and
if required, guiding a user in a further course to voice input an additional information or a defined phrase input by which the voice recognition device can recognize that at least a part of the voice statement is the additional information.

10. The process according to claim 9, further comprising the acts of:
after the input of the voice statement, assigning the voice statement via the voice recognition device to one of at least two input categories, a first input category being defined as a phrase input if the voice recognition device considers a part of the voice statement to be the additional information, and a second input category being defined as a single-word input if the voice recognition device considers no part of the voice statement to be the additional information.

11. The process according to claim 6, further comprising the acts of:
searching the entire voice statement in the second database when no part of the voice statement is considered to be additional information; and
selecting from the second database the stored additional information having the highest recognition probability as the entered destination name.

12. The process according to claim 11, further comprising the act of:
if the additional information is not recognized in the second database, requesting the user within the scope of the further input dialog to carry out a voice input of an additional information.

13. The process according to claim 12, wherein the defined phrase input includes at least a destination name and an additional information.

14. The process according to claim 9, wherein the defined phrase input includes at least a destination name and an additional information.

15. The process according to claim 14, further comprising the act of:
categorizing an entered voice statement as the phrase input when a part of the voice statement is recognized as a preposition or as additional information which is proceeded by a part of the voice statement.

16. The process according to claim 9, further comprising the act of:
categorizing an entered voice statement as the phrase input when a part of the voice statement is recognized as a preposition or as additional information which is proceeded by a part of the voice statement.

17. The process according to claim 10, wherein the defined phrase input includes at least a destination name and an additional information.

18. The process according to claim 10, further comprising the act of:
categorizing an entered voice statement as the phrase input when a part of the voice statement is recognized as a preposition or as additional information which is proceeded by a part of the voice statement.

19. The process according to claim 11, wherein the defined phrase input includes at least a destination name and an additional information.

20. The process according to claim 11, further comprising the act of:
categorizing an entered voice statement as the phrase input when a part of the voice statement is recognized as a preposition or as additional information which is proceeded by a part of the voice statement.

21. The process according to claim 12, further comprising the act of:
categorizing an entered voice statement as the phrase input when a part of the voice statement is recognized as a preposition or as additional information which is proceeded by a part of the voice statement.

22. The process according to claim 3, further comprising the acts of:
after the input of the voice statement, assigning the voice statement via the voice recognition device to one of at least two input categories, a first input category being defined as a phrase input if the voice recognition device considers a part of the voice statement to be the additional information, and a second input category being defined as a single-word input if the voice recognition device considers no part of the voice statement to be the additional information.

23. The process according to claim 22, further comprising the acts of:
searching the entire voice statement in the second database when no part of the voice statement is considered to be additional information; and
selecting from the second database the stored additional information having the highest recognition probability as the entered destination name.

24. The process according to claim 23, further comprising the act of:
if the additional information is not recognized in the second database, requesting the user within the scope of the further input dialog to carry out a voice input of an additional information.

25. The process of claim 3, wherein the partial data stock is generated only after the part of the entered voice statement is recognized as additional information.

26. A method for processing a voice statement, the method comprising the acts of:
receiving a voice statement that includes at least a destination name and a regionally limiting additional information that unambiguously identifies the destination name;

comparing the additional information of the received voice statement with information stored in a second database;

generating a subset of data from a first database responsive to a match between the additional information of the received voice statement and the information stored in the second database; and comparing the destination name of the received voice statement with the subset of data.

27. The method of claim 26, wherein the first database includes flag symbols and the subset of data from the first database is generated using the flag symbols.

\* \* \* \* \*